(12) United States Patent
Tanumihardja et al.

(10) Patent No.: US 7,533,187 B1
(45) Date of Patent: May 12, 2009

(54) WIRELESS DEVICE DETECTION

(76) Inventors: Marcellino Tanumihardja, 1431 195th Place SW, Lynnwood, WA (US) 98036; Gregory A. Brown, 13936 SE. 158th St., Renton, WA (US) 98058

( * ) Notice: Subject to any disclaimer, the term of this patent is extended or adjusted under 35 U.S.C. 154(b) by 564 days.

(21) Appl. No.: 09/894,279

(22) Filed: Jun. 27, 2001

Related U.S. Application Data

(60) Provisional application No. 60/282,381, filed on Apr. 5, 2001.

(51) Int. Cl.
*G06F 15/16* (2006.01)

(52) U.S. Cl. .................................... 709/245; 709/206

(58) Field of Classification Search ................ 709/217, 709/218, 219, 246; 715/513
See application file for complete search history.

(56) References Cited

U.S. PATENT DOCUMENTS

| | | | |
|---|---|---|---|
| 5,396,537 A | | 3/1995 | Schwendeman |
| 5,675,733 A | | 10/1997 | Williams |
| 5,878,230 A | | 3/1999 | Weber |
| 5,930,471 A | | 7/1999 | Milewski |
| 6,147,977 A | * | 11/2000 | Thro et al. .................. 370/265 |
| 6,260,024 B1 | | 7/2001 | Shkedy |
| 6,370,566 B2 | * | 4/2002 | Discolo et al. .............. 709/206 |
| 6,430,624 B1 | * | 8/2002 | Jamtgaard et al. ........... 709/246 |
| 6,463,462 B1 | | 10/2002 | Smith |
| 6,499,018 B1 | | 12/2002 | Alaia |
| 6,529,725 B1 | | 3/2003 | Joao |
| 6,609,156 B1 | | 8/2003 | Magolan |
| 6,636,888 B1 | | 10/2003 | Bookspan |
| 6,715,129 B1 | * | 3/2004 | Hind et al. .................. 715/513 |
| 6,741,853 B1 | * | 5/2004 | Jiang et al. .................. 709/219 |
| 6,741,855 B1 | * | 5/2004 | Martin et al. ............... 455/419 |
| 6,785,730 B1 | * | 8/2004 | Taylor ........................ 709/246 |

OTHER PUBLICATIONS

Phone.com, Press Release: GVC Licenses Phone.com UP.Browser Microbrowser for Mobile Phones in Asis and Europe, Redwood City, CA, 3 pages, Feb. 23, 2000.*
Didier, Martin, Adapting Content for VoiceXML, Published on XML.com, http://www.xml.com/pub/a/2000/08/23/didier/index.htm 5 pages, Aug. 2000.*
Zaplet Appmail website printed Sep. 17, 2001 pp. 1-26.
Evite.com website printed Sep. 17, 2001 pp. 1-35.
Envoyworldwide website printed Sep. 18, 2001 pp. 1-5.
"air2web—2Notify Enterprise Alerting—Alerts on Every Enterprise Messaging Channel," <http://www.air2web.com/2notify_eaf.php> [Retrieved Oct. 7, 2005], 2005, pp. 1-2.

(Continued)

*Primary Examiner*—Patrice Winder
(74) *Attorney, Agent, or Firm*—Christensen O'Connor Johnson Kindness PLLC

(57) ABSTRACT

In one embodiment, a method includes but is not limited to detecting a wireless-device capability. In addition to the foregoing, other method embodiments are described in the claims, drawing, and text forming a part of the present application. In one or more various embodiments, related systems include but are not limited to circuitry for effecting the foregoing-described method embodiments; the circuitry can be virtually any combination of hardware, software, and/or firmware configured to effect the foregoing-described method embodiments depending upon the design choices of the system designer.

65 Claims, 16 Drawing Sheets

OTHER PUBLICATIONS

"(BW) (WA-Mobliss) American Idol Teams with Mobliss to Help Fans Choose America's Next Idol," <http://www.businesswire.com/cgi-bin/f_headline.cgi?bw.011703/230172086> [Retrieved Oct. 7, 2005], Jan. 17, 2003, pp. 1-2.

"Cingular Wireless Licenses Air2Web's 2Notify Platform to Manage Text Messaging Services," <http://www.air2web.com/pr_display.php?id=107> [Retrieved Oct. 7, 2005], pp. 1-2.

"Inaugural College Music Awards™ Garner Top Partners Rolling Stone®, Westwood One and Mobliss®," Zilo Networks, <http://www.zilo.com/docs/.

"Mobile Messaging—Wireless," GoldPocket Interactive, <http://www.goldpocket.com/Corp/Main.aspz?11=1&sp=1_3_1&t=Main> [Retrieved Oct. 7, 2005], 2005, p. 1.

"Mobliss Selected to Deliver Interactive Wireless Polling for New Fox Series—The Jury," Mobliss Corporation, <http://www.mobliss.com/about/newroom/2004.06.07.jsp> [Retrieved Oct. 7, 2005], Jun. 7, 2004, p. 1.

"Nextel Calls on Fans to Pick All-Star Competitor; For the First Time, Fans Will Vote-in a Driver for Nascar Nextel All-Star Challenge," <http://phx.corporate-ir.net/phoenix.zhtml?c=63347&p=irol-newsArticle_print&ID=526687&highlight> [Retrieved Oct. 7, 2005], May 13, 2004, pp. 1-2.

"Text Messaging—Words Have Power," Mobliss Corporation <http://mobliss.com/ products/messaging/> [Retrieved Oct. 7, 2005], 2004, p. 1.

"Zee TV Viewers, in the UK, Go Wirelss Using Air2Web—Zee Fans Vote for Zee Cine Awards Using Their Cell Phones," <http://www.air2web.com/pr_display.php?id=130> [Retrieved Oct. 7, 2005], Mar. 28, 2005, p. 1.

"It's a Party - Who's Got the Chips?" Inside the Internet 7(12):1-6, Dec. 2000.

* cited by examiner

WIRELESS DEVICE DETECTION

CROSS-REFERENCE(S) TO RELATED APPLICATION(S)

This patent application hereby incorporates by reference in its entirety the pending Provisional Patent Application entitled MANAGED MESSAGING PLATFORM, Application No. 60/282,381, naming Marcellino Tanumihardja and Gregory Brown as inventors, filed via Express Mail on 5 Apr. 2001, and also claims the benefit of this Provisional Patent Application No. 60/282,381 under the auspices of 35 U.S.C. 119(e).

FIELD OF THE INVENTION

The present application relates, in general, to wireless communication.

BACKGROUND OF THE INVENTION

Wireless communication refers to communication between sending and receiving stations via electromagnetic radiation not guided by any hard physical path (e.g., by microwave link). Examples of wireless communication are communication via cellular telephony systems, Personal Communication Systems, or Global System for Mobile Communication systems.

Wireless communication is typically accomplished via users exchanging voice and/or alphanumeric data by use of at least one wireless device. One example of wireless communication is that of a first wireless-device user exchanging voice and/or alphanumeric data with a group of two or more other wireless-device users.

It has been noted by the inventors named herein (the inventors) that when a first wireless-device user finds it advantageous to exchange voice and/or alphanumeric data with a group of wireless-device users, the first wireless-device user may want to disseminate information to the group, or may instead want to both disseminate information to the group and receive feedback from the group members in response to the disseminated information. It has been further noted by the inventors that difficulties arise when the at least a first wireless device user and at least one wireless device user in the group of wireless device users are using different types of wireless devices. In particular, it has been noted that in such instances communication failure will often occur.

In light of the foregoing, the inventors have determined that it would be advantageous to have methods and systems which allow detection of a type of wireless device utilized by a particular user, so that communications to and from the wireless device could be processed in the fashion appropriate to the wireless device.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One aspect of the claimed subject matter includes a method that comprises creating a managed message to be sent to a list of recipient devices selected from a group of managed message types consisting of a memo, a meeting, and an event. Each managed message type is further selected from a group of structured messaging element types consisting of an RSVP, a query, a thing to bring, a comment, a sender location, an electronic card, recipient list exposure, and an electronic commerce transaction. The method further comprises validating a format of an address of each recipient device from the list of recipient devices and determining a target wireless-device type by an asynchronous process that performs device processing. The asynchronous process marks the address as undeliverable if the format of the address associated with a recipient device is invalid. The method further comprises receiving a response aggregation.

Another aspect of the claimed subject matter includes a system that comprises means for creating a managed message to be sent to a list of recipient devices selected from a group of managed message types consisting of a memo, a meeting, and an event. Each managed message type is further selected from a group of structured messaging element types consisting of an RSVP, a query, a thing to bring, a comment, a sender location, an electronic card, recipient list exposure, and an electronic commerce transaction. The system further comprises means for validating a format of an address of each recipient device from the list of recipient devices and determining a target wireless-device type by an asynchronous process that performs device processing. The asynchronous process marks the address as undeliverable if the format of the address associated with a recipient device is invalid. The system further comprises means for receiving a response aggregation.

A further aspect of the claimed subject matter includes a system which comprises a first component configured to create a managed message to be sent to a list of recipient devices selected from a group of managed message types consisting of a memo, a meeting, and an event. Each managed message type is further selected from a group of structured messaging element types consisting of an RSVP, a query, a thing to bring, a comment, a sender location, an electronic card, recipient list exposure, and an electronic commerce transaction. The system further comprises a second component configured to validate a format of an address of each recipient device from the list of recipient devices and a third component configured to determine a target wireless-device type by an asynchronous process that performs device processing. The asynchronous process marks the address as undeliverable if the format of the address associated with a recipient device is invalid. The system further comprises a fourth component configured to receive a response aggregation, said fourth component selected from an electrical-component group including electrical component having at least one discrete electrical component, electrical component having at least one integrated component, electrical component having at least one application specific integrated component, electrical component forming a general purpose computing device configured by a computer program, electrical component forming a memory device, and/or electrical component forming a communications device.

An additional aspect of the claimed subject matter includes a method which comprises detecting a wireless-device response aggregation event, the wireless-device response aggregation event being selected from a group of managed message types consisting of a memo, a meeting, and an event. Each managed message type is further selected from a group of structured messaging element types consisting of an RSVP, a query, a thing to bring, a comment, a sender location, an electronic card, recipient list exposure, and an electronic commerce transaction. The method further comprises determining a target wireless-device type.

A yet further aspect of the claimed subject matter includes a system which comprises a first component configured to detect a wireless-device response aggregation event, the wireless-device response aggregation event being selected from a group of managed message types consisting of a memo, a meeting, and an event. Each managed message type is further selected from a group of structured messaging element types consisting of an RSVP, a query, a thing to bring, a comment, a sender location, an electronic card, recipient list exposure, and an electronic commerce transaction. The system further comprises a second component configured to determine a target wireless-device type.

One more aspect of the claimed subject matter includes a system which comprises means for detecting a wireless-device response aggregation event, the wireless-device response aggregation event being selected from a group of managed message types consisting of a memo, a meeting, and an event. Each managed message type is further selected from a group of structured messaging element types consisting of an RSVP, a query, a thing to bring, a comment, a sender location, an electronic card, recipient list exposure, and an electronic commerce transaction. The system also comprises means for determining a target wireless-device type.

An added aspect of the claimed subject matter includes a computer-readable medium having computer-executable instructions stored thereon for implementing a computer-implementable method, which comprises creating a managed message to be sent to a list of recipient devices selected from a group of managed message types consisting of a memo, a meeting, and an event. Each managed message type is further selected from a group of structured messaging element types consisting of an RSVP, a query, a thing to bring, a comment, a sender location, an electronic card, recipient list exposure, and an electronic commerce transaction. The method further comprises validating a format of an address of each recipient device from the list of recipient devices and determining a target wireless-device type by an asynchronous process that performs device processing. The asynchronous process marks the address as undeliverable if the format of the address associated with a recipient device is invalid. The method further comprises receiving a response aggregation.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

Figure 13:
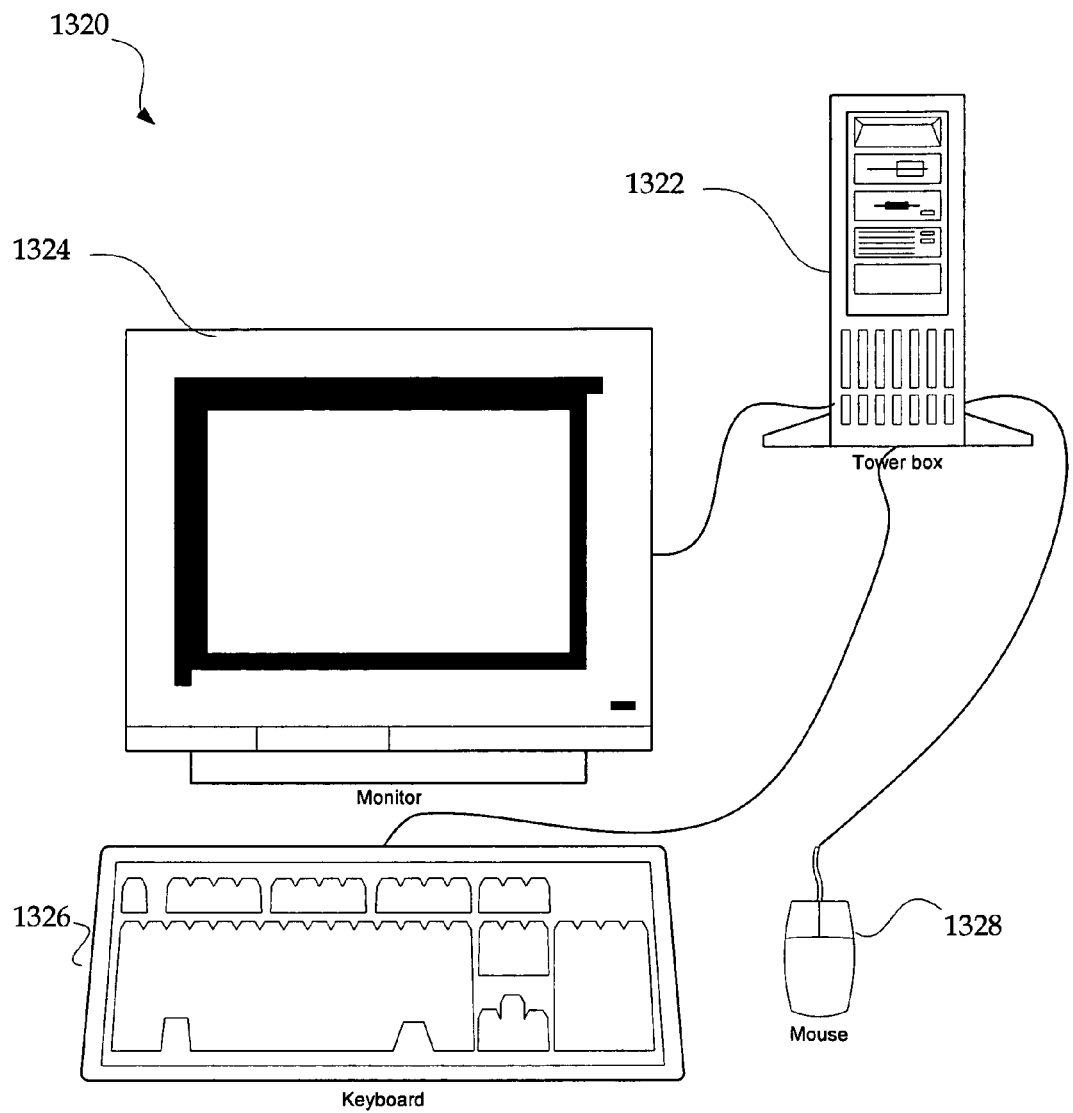

With reference now to FIG. 13, depicts a pictorial representation of a conventional data processing system in which illustrative embodiments of the devices and/or processes described herein may be implemented.

Figure 16:
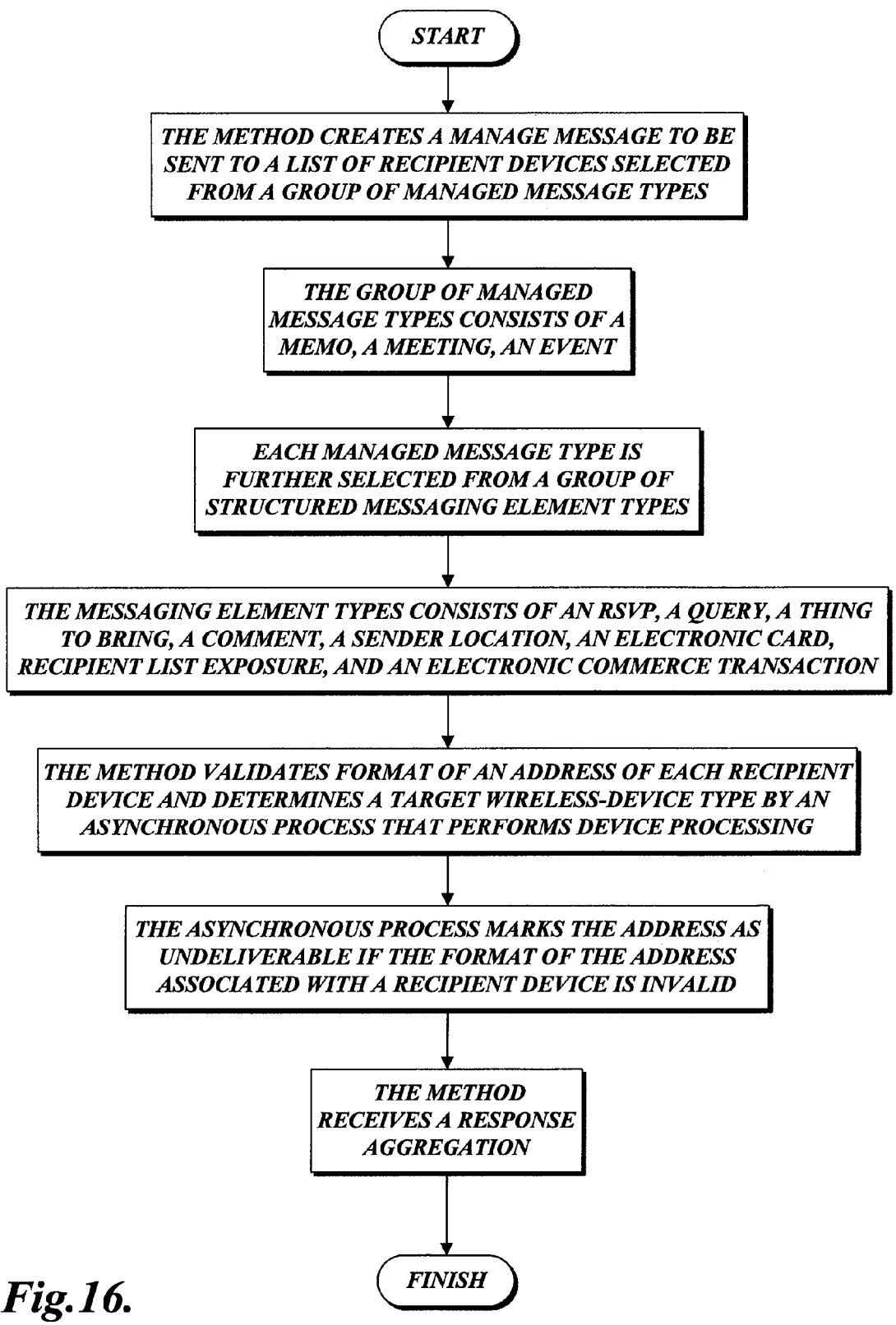

FIG. 16 illustrates a process diagram.

The use of the same reference symbols in different drawings indicates similar or identical items.

DETAILED DESCRIPTION OF THE PREFERRED EMBODIMENT

Figure 1:
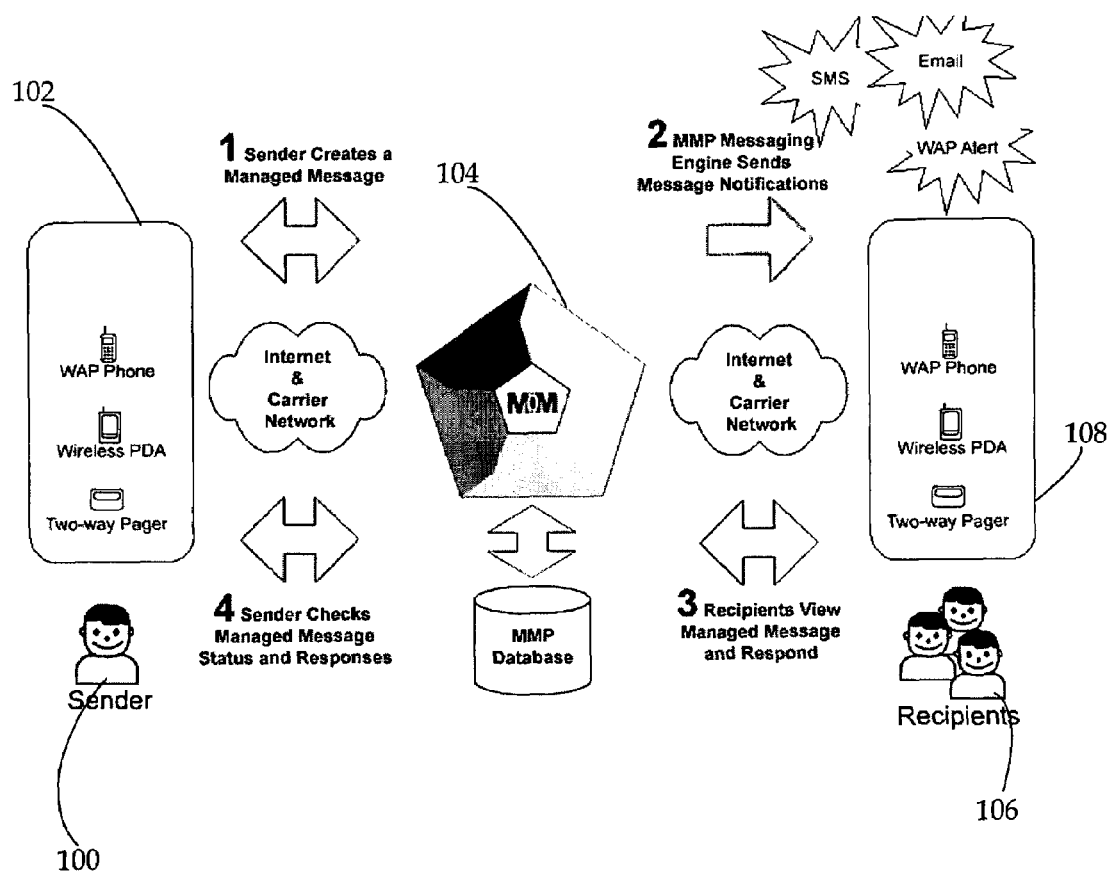
FIG. 1 shows a pictographic representation of an environment wherein methods and systems described herein may be utilized.

With reference now to FIG. 1, shown is a pictographic representation of an environment wherein methods and systems described herein may be utilized. First, depicted in FIG. 1 is that sender 100, by use of wireless device 102 creates a message via communication with Managed Messaging Platform (MMP) engine 104 (as shown, wireless device 102 may be any type of wireless device such as a Wireless Application Protocol (WAP) phone, a wireless Personal Digital Assistant (PDA), or a two-way pager). Second, illustrated is that MMP engine 104 sends message notifications to each wireless device 108 associated with each desired recipient forming group of desired recipients 106 (as shown, each wireless device 108 may be any type of wireless device such as a Wireless Application Protocol (WAP) phone, a wireless Personal Digital Assistant (PDA), or a two-way pager). Third, shown is that one or more desired recipients in group of desired recipients 106 view and/or respond to the message via communication with MMP engine 104, where such viewing and/or responding is achieved via each desired recipient's use of his or her respective wireless device 108. Fourth, depicted is that sender 100, via communication with MMP engine 104, uses his wireless device 102 to check the message status and responses, where the statuses and responses may have been aggregated by MMP engine 104. For more details related to the foregoing scheme, please see herein incorporated by reference Provisional Patent Application 60/282,381.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either substeps or additional steps building on one or more earlier-presented flowcharts. Those having ordinary skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations.

Figure 2:
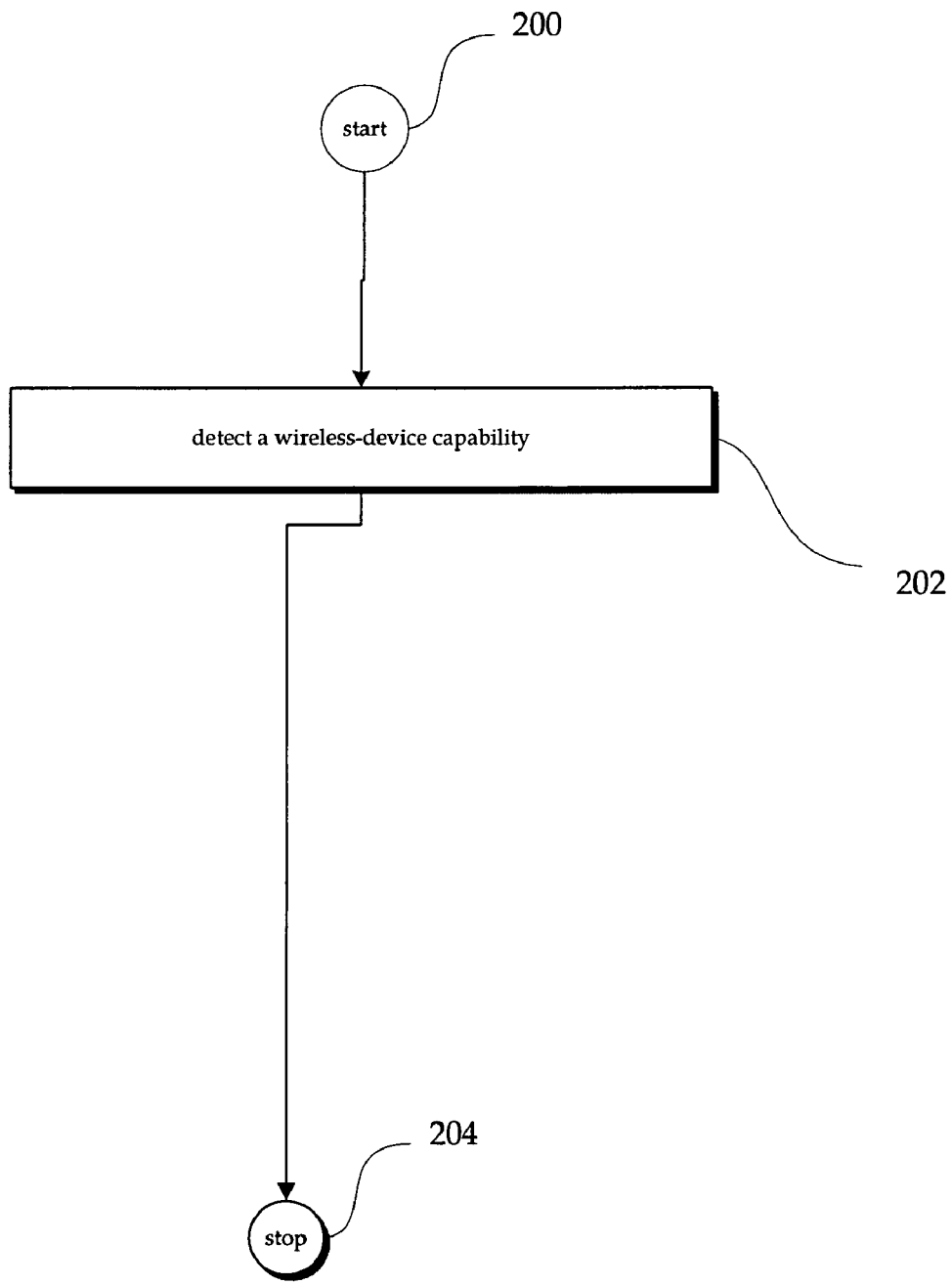
FIG. 2 shows a process that depicts detecting a wireless-device capability.

With reference now to FIG. 2, shown is an implementation of a high-level logic flowchart depicting a process. Method step 200 shows the start of the process. Method step 202 depicts detecting a wireless-device capability. Method step 204 illustrates the end of the process. In one device implementation, method step 202 is achieved by a wireless web server entity (e.g., a part of MMP engine 104 of FIG. 1) when a user (e.g., a member of group of desired recipients 106) contacts the wireless web server entity via a wireless web browser running on the user's cell phone (e.g., wireless device 108).

Figure 3:
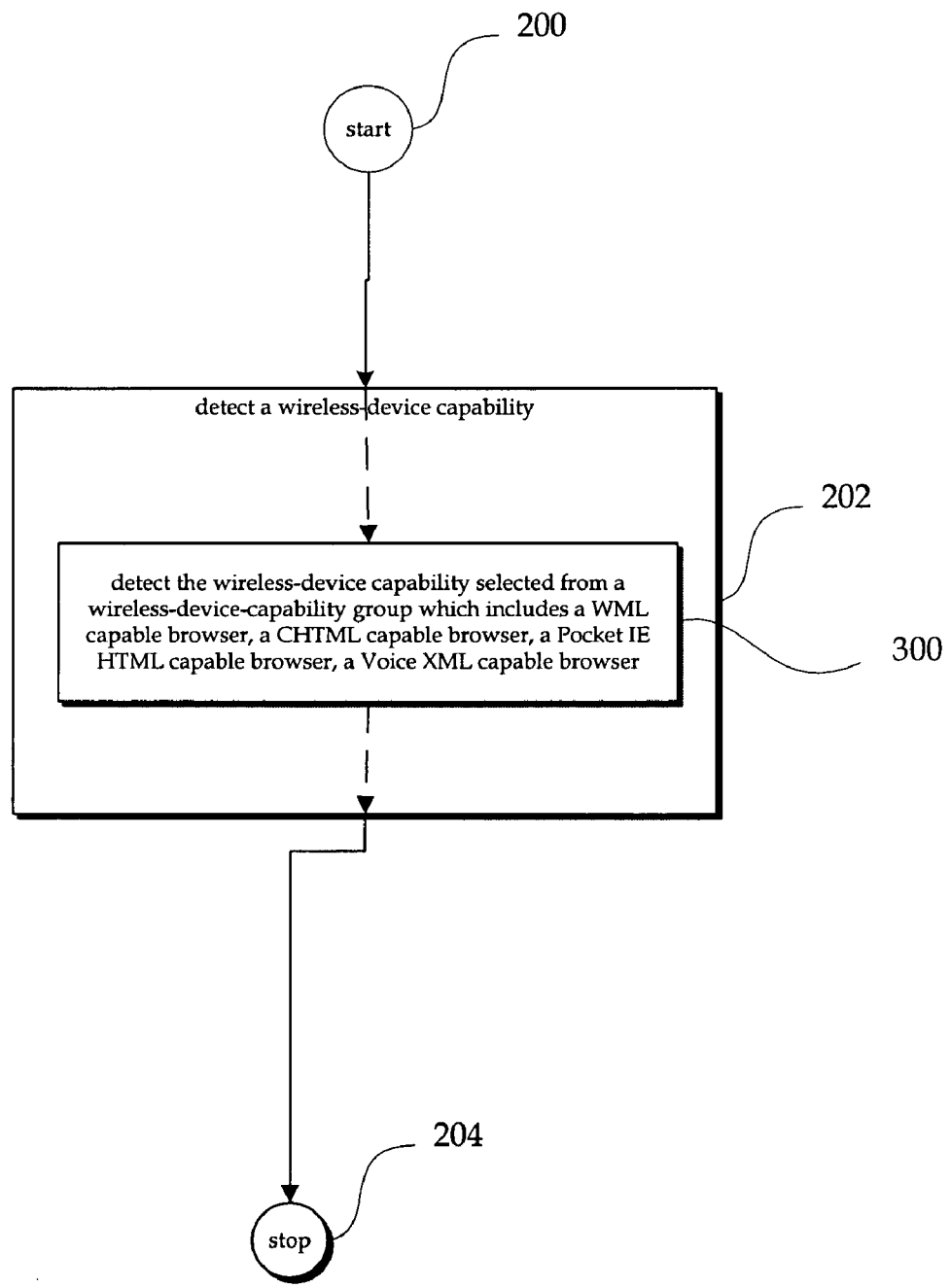
FIG. 3 depicts that, in one implementation, method step 202 can include method step 300.

For additional examples of the process of FIG. 3 and device implementations thereof, please see herein incorporated by reference Provisional Patent Application No. 60/282,381.

With reference now to FIG. 3, shown is an implementation of the high-level logic flowchart shown in FIG. 2. Depicted in FIG. 3 is that, in one implementation, method step 202 can include method step 300. Illustrated is that, in one implementation, detecting a wireless-device capability can include, but is not limited to, detecting the wireless-device capability selected from a wireless-device-capability group which includes a WML (Wireless Markup Language) capable browser, a CHTML (Compact Hypertext Markup Language) capable browser, a Pocket Internet Explorer (IE) HTML (Hypertext Markup Language) capable browser, and a Voice XML (Extensible Markup Language) capable browser. In one device implementation, method step 300 is achieved by a wireless web server entity (e.g., a part of MMP engine 104 of FIG. 1) when a user (e.g., a member of group of desired recipients 100) contacts the wireless web server entity via a wireless web browser (e.g., a WAP browser) on the user's web-enabled cell phone (e.g., wireless device 108).

For additional examples of the process of FIG. 3 and device implementations thereof, please see herein incorporated by reference Provisional Patent Application No. 60/282,381. The remaining method steps of FIG. 3 function substantially as described elsewhere herein.

Figure 14:
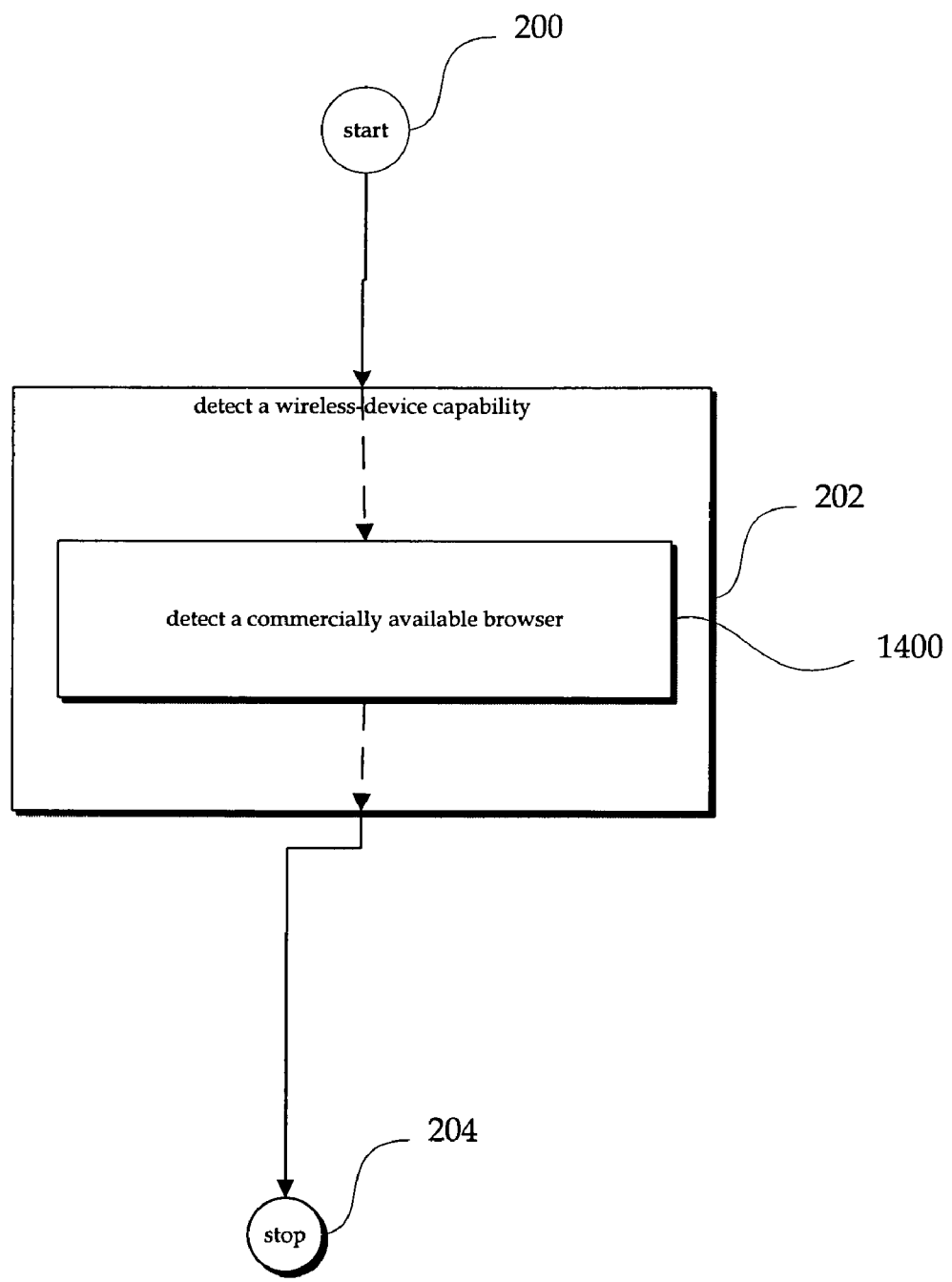
FIG. 14 shows an implementation of the high-level logic flowchart shown in FIG. 2.

With reference now to FIG. 14, shown is an implementation of the high-level logic flowchart shown in FIG. 2. Depicted in FIG. 14 is that, in one implementation, method step 202 can include method step 1400. Illustrated is that, in one implementation, detecting a wireless-device capability can include, but is not limited to, detecting a commercially available browser. In one device implementation, method step 1400 is achieved by a wireless web server entity (e.g., a part of MMP engine 104 of FIG. 1) when a user (e.g., a member of group of desired recipients 106) contacts the wireless web server entity via a wireless web browser on the user's web-enabled cell phone (e.g., wireless device 108).

For additional examples of the process of FIG. 14 and device implementations thereof, please see herein incorporated by reference Provisional Patent Application No. 60/282, 381. The remaining method steps of FIG. 14 function substantially as described elsewhere herein.

Figure 15:
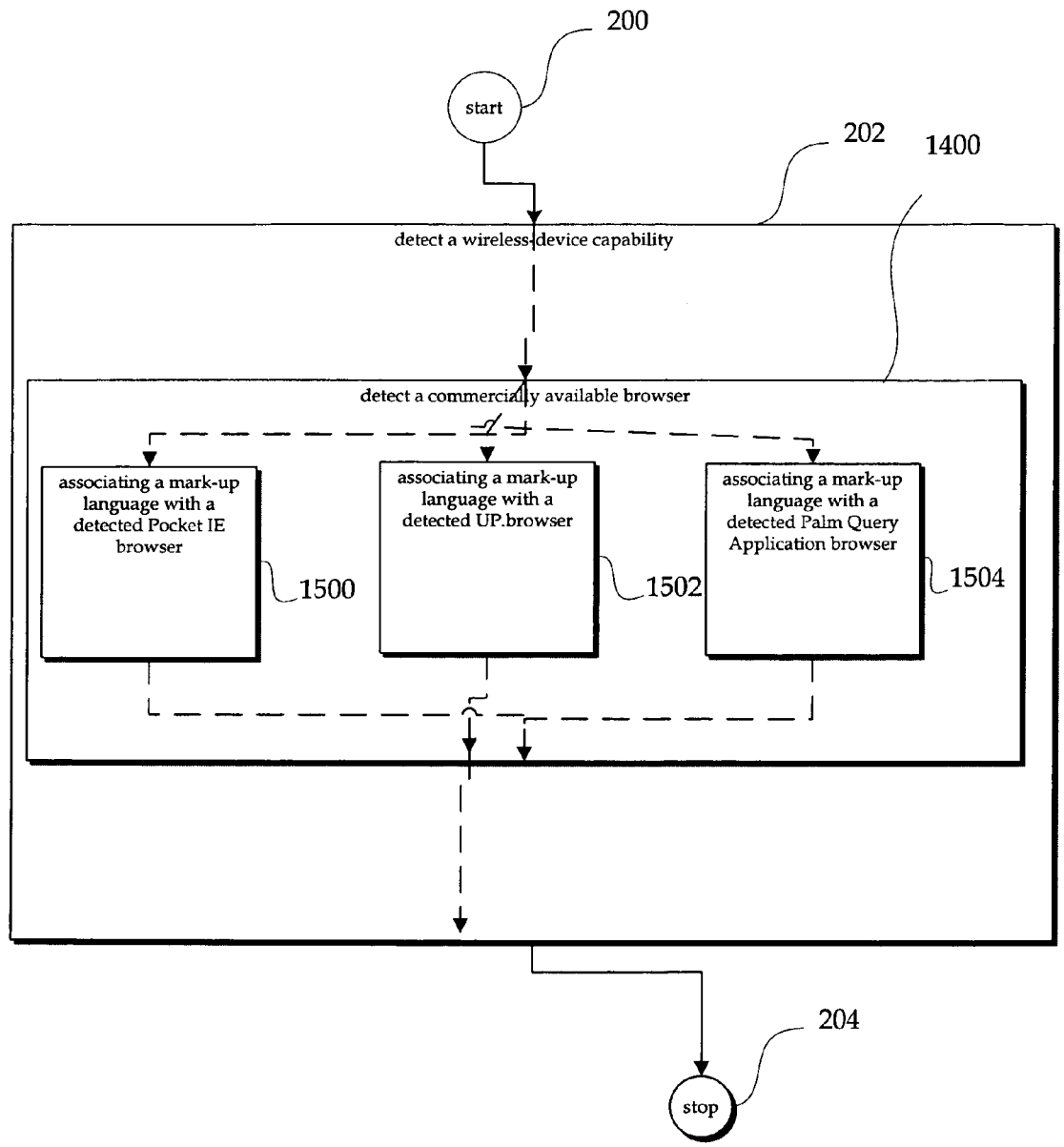
FIG. 15 shows two alternate implementations of the high-level logic flowchart shown in FIG. 14.

With reference now to FIG. 15, shown are two alternate implementations of the high-level logic flowchart shown in FIG. 14. Depicted in FIG. 15 is that, in one implementation, method step 1400 includes method step 1500; further depicted is that, in another implementation, method step 1400 includes method step 1502; further depicted is that, in yet another implementation, method step 1400 includes method step 1504. Method step 1500 shows that, in one implementation, detecting a commercially available browser can include, but is not limited to, associating a mark-up language with a detected Pocket IE (Internet Explorer) browser. In one device implementation, method step 1500 is achieved by a wireless web server entity (e.g., a part of MMP engine 104 of FIG. 1) via recall of a mark-up language type associated with a version number of Pocket IE browser when a user (e.g., a member of group of desired recipients 100) contacts the wireless web server entity via a wireless web browser on the user's web-enabled cell phone (e.g., wireless device 108).

Method step 1502 shows that, in one implementation, detecting a commercially available browser can include, but is not limited to, associating a mark-up language with a detected UP.browser. In one device implementation, method step 1502 is achieved by a wireless web server entity (e.g., a part of MMP engine 104 of FIG. 1) via recall of a mark-up language type associated with a version number of UP.browser when a user (e.g., a member of group of desired recipients 100) contacts the wireless web server entity via a wireless web browser on the user's web-enabled cell phone (e.g., wireless device 108).

Method step 1504 shows that, in one implementation, detecting a commercially available browser can include, but is not limited to, associating a mark-up language with a detected Palm Query Application browser. In one device implementation, method step 1504 is achieved by a wireless web server entity (e.g., a part of MMP engine 104 of FIG. 1) via recall of a mark-up language type associated with a version number of Palm Query Application browser when a user (e.g., a member of group of desired recipients 100) contacts the wireless web server entity via a wireless web browser on the user's web-enabled cell phone (e.g., wireless device 108).

For additional examples of the process of FIG. 15 and device implementations thereof, please see herein incorporated by reference Provisional Patent Application No. 60/282, 381. The remaining method steps of FIG. 15 function substantially as described elsewhere herein.

Figure 4:
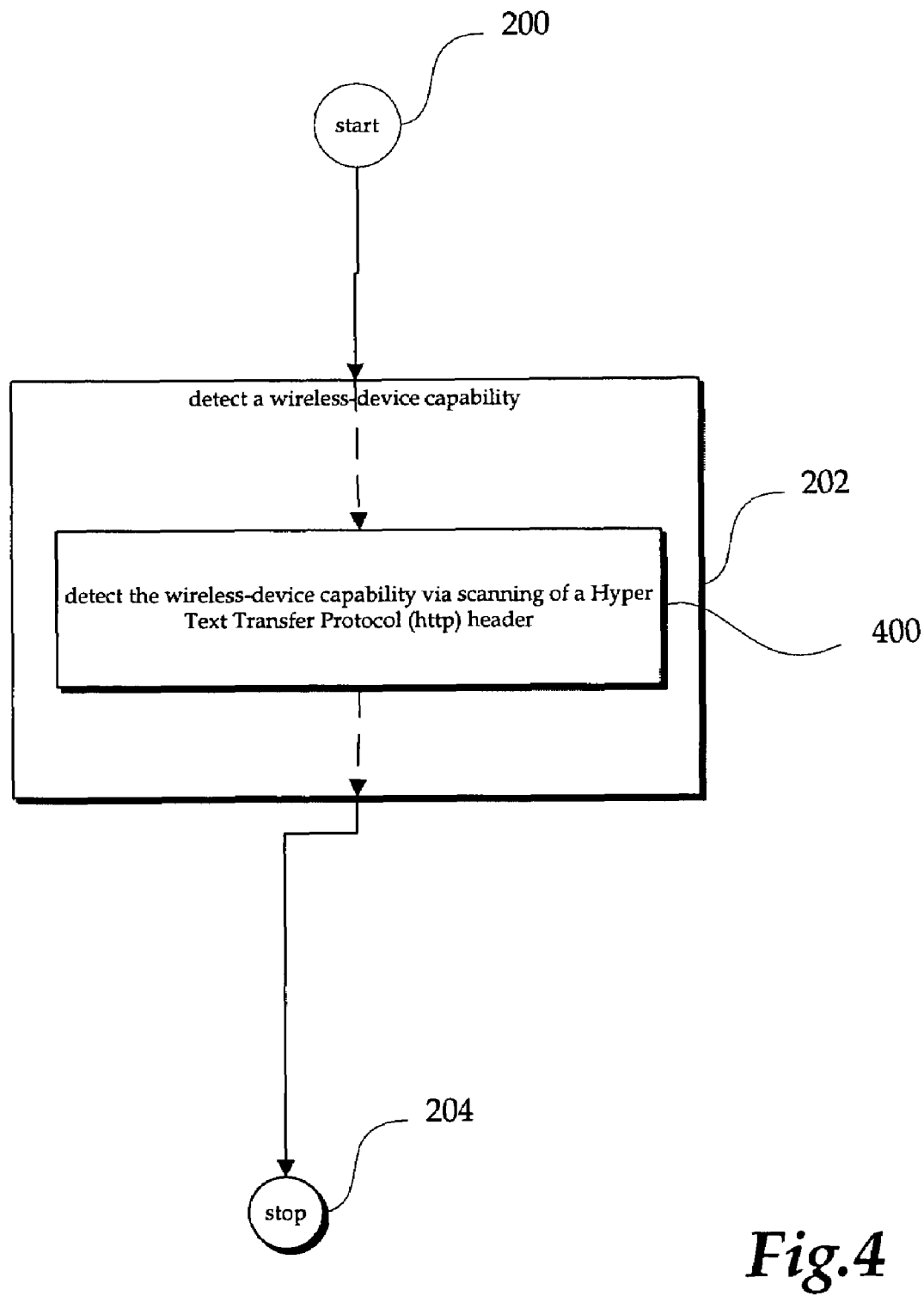
FIG. 4 depicts that, in one implementation, method step 202 can include method step 400.

With reference now to FIG. 4, shown is an implementation of the high-level logic flowchart shown in FIG. 2. Depicted in FIG. 4 is that, in one implementation, method step 202 can include method step 400. Illustrated is that, in one implementation, detecting a wireless-device capability can include, but is not limited to, detecting the wireless-device capability via scanning of a Hyper Text Transfer Protocol (http) header. In one device implementation, method step 400 is achieved by a wireless web server entity (e.g., a part of MMP engine 104 of FIG. 1) reading the http header associated with a wireless-device capability when a user (e.g., a member of group of desired recipients 100) contacts the wireless web server entity via a wireless web browser (e.g., a WAP browser) running on the user's web-enabled cell phone (e.g., wireless device 108). That is, when the wireless web server entity receives an http data unit, the wireless web server entity identifies the wireless-device capability based on a wireless-device capability with which the http header is associated.

For additional examples of the process of FIG. 4 and device implementations thereof, please see herein incorporated by reference Provisional Patent Application No. 60/282,381. The remaining method steps of FIG. 4 function substantially as described elsewhere herein.

Figure 5:
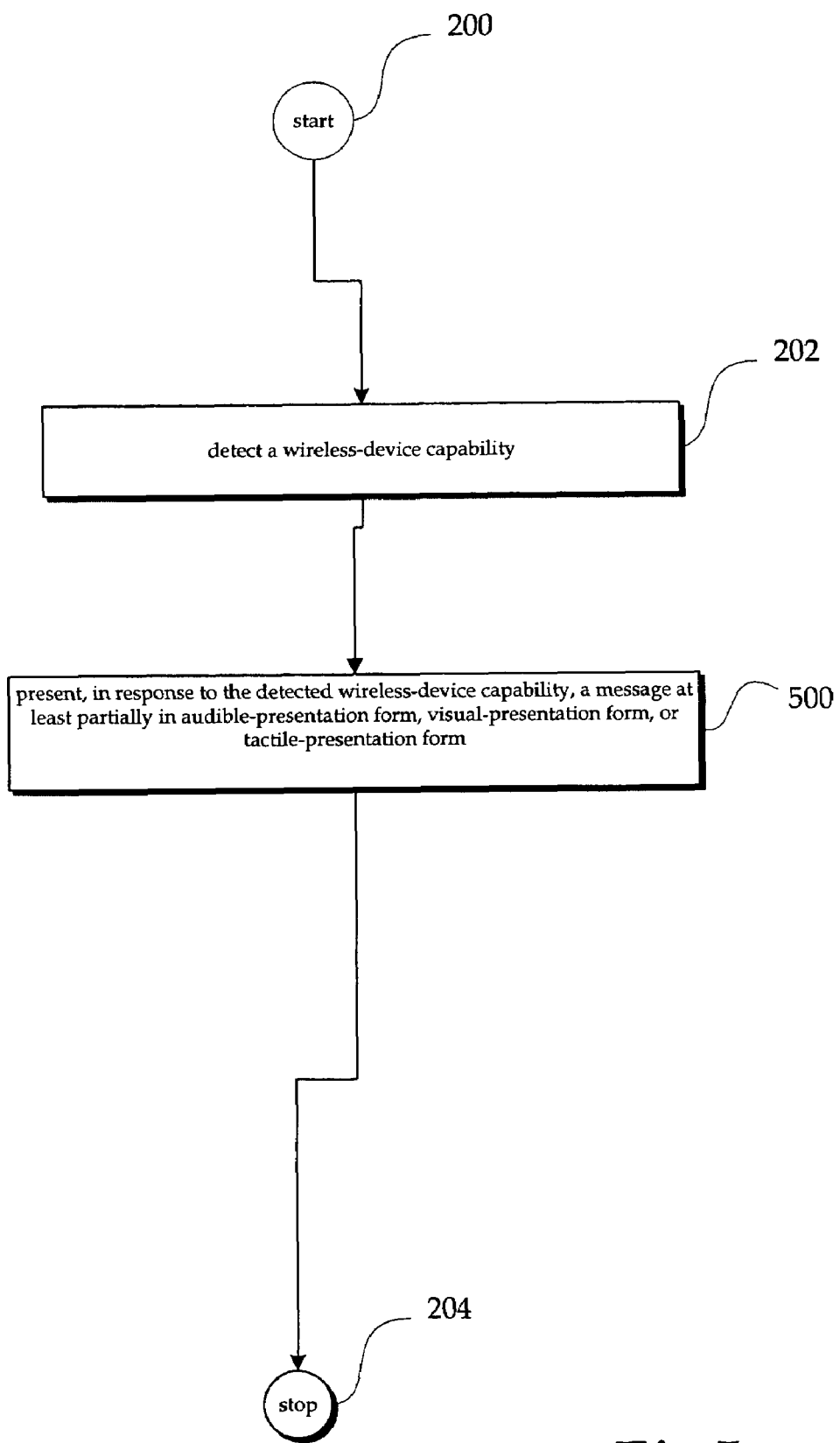
FIG. 5 shows that, in one implementation, the high-level logic flowchart further includes method step 500, which depicts presenting, in response to the detected wireless-device capability, a message at least partially in audible-presentation form, or tactile-presentation form.

With reference now to FIG. 5, shown is an alternate implementation of the high-level logic flowchart shown in FIG. 3. Depicted in FIG. 5 is that, in one implementation, the high-level logic flowchart further includes method step 500, which depicts presenting, in response to the detected wireless-device capability, a message at least partially in audible-presentation form, visual-presentation form, or tactile-presentation form. In various device implementations, method step 500 is achieved by a wireless web server entity (e.g., a part of MMP engine 104 of FIG. 1), subsequent to detecting the wireless-device capability, causing a message to be presented through a wireless device (e.g., wireless device 102) through the wireless device's audio presentation system (e.g., the wireless device's speaker system), the wireless device's visual-presentation system (e.g., the wireless device's screen), or the wireless device's tactile-presentation system (e.g., the wireless device's vibratory alert).

For additional examples of the process of FIG. 5 and device implementations thereof, please see herein incorporated by reference Provisional Patent Application No. 60/282,381. The remaining method steps of FIG. 5 function substantially as described elsewhere herein.

Figure 6:
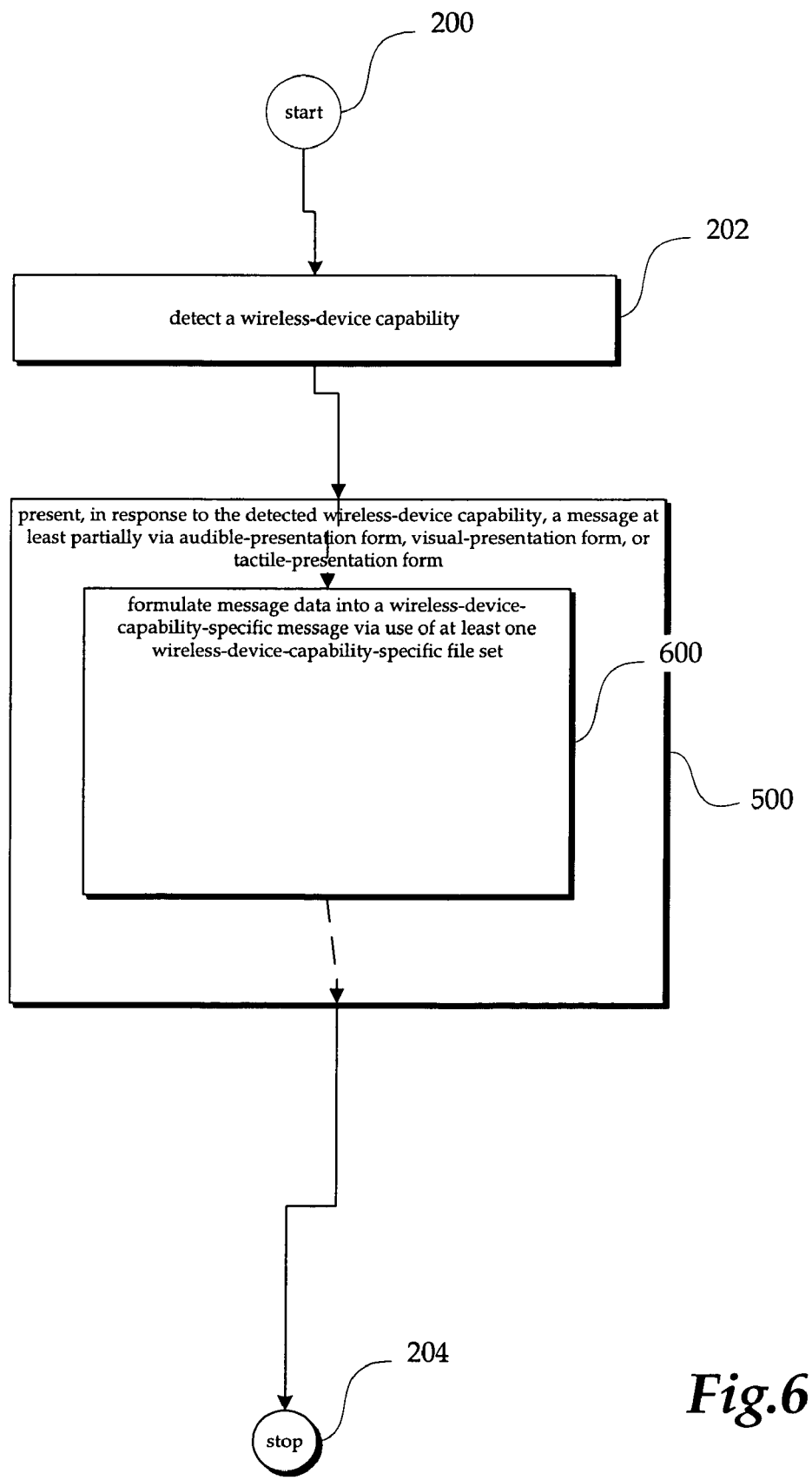
FIG. 6 depicts that, in one implementation, method step 500 can include method step 600.

With reference now to FIG. 6, shown is an implementation of the high-level logic flowchart shown in FIG. 5. Depicted in FIG. 6 is that, in one implementation, method step 500 can include method step 600. Illustrated is that, in one implementation, presenting, in response to the detected wireless-device capability, a message at least partially in audible-presentation form, visual-presentation form, or tactile-presentation form can include, but is not limited to, formulating message data into a wireless-device-capability-specific message via use of at least one wireless-device-capability-specific file set. In one device implementation, method step 600 is achieved by a wireless web server entity (e.g., a part of MMP engine 104 of FIG. 1), subsequent to detecting the wireless-device capability, causing a message to be presented through a wireless device (e.g., wireless device 102) by formulating message data (which makes up the message) into a format appropriate to the wireless device (that is, the message is put in a form the wireless device can "understand") via use of a file set appropriate to the wireless device through which the message is to be presented.

For additional examples of the process of FIG. 6 and device implementations thereof, please see herein incorporated by reference Provisional Patent Application No. 60/282,381. The remaining method steps of FIG. 6 function substantially as described elsewhere herein.

Figure 7:
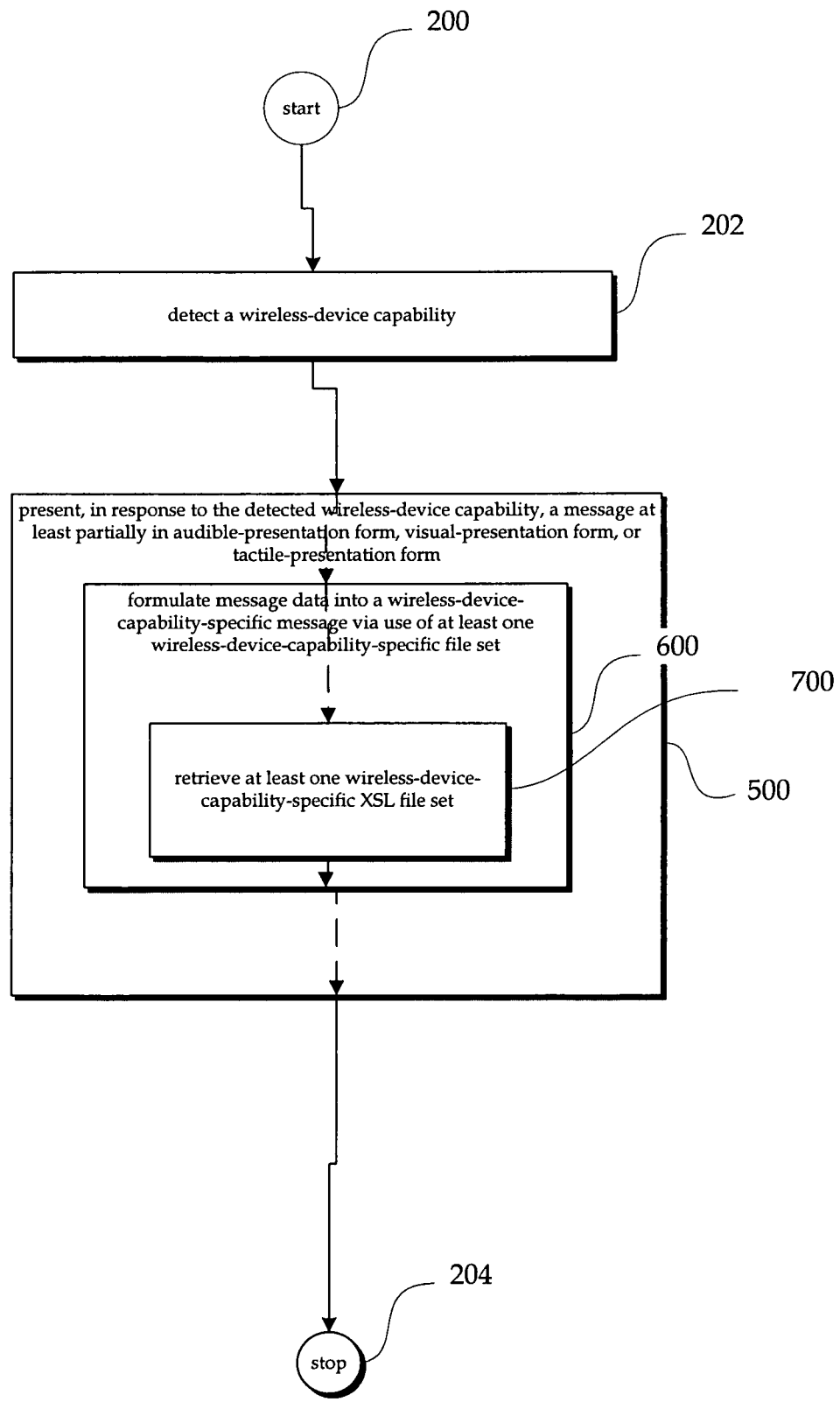
FIG. 7 depicts that, in one implementation, method step 600 can include method step 700.

With reference now to FIG. 7, shown is an implementation of the high-level logic flowchart shown in FIG. 6. Depicted in FIG. 7 is that, in one implementation, method step 600 can include method step 700. Illustrated is that, in one implementation, formulating message data into a wireless-device-capability-specific message via use of the at least one wireless-device-capability-specific file set can include, but is not limited to, retrieving at least one wireless-device-capability-specific XSL (Extensible Style Language) file set. In one device implementation, method step 700 is achieved by a wireless web server entity (e.g., a part of MMP engine 104 of FIG. 1), subsequent to detecting the wireless-device capability, formulating message data (which makes up the message) into a format appropriate to the wireless device (that is, the message is put in a form the wireless device can "understand") via retrieval of a wireless-device-capability-specific XSL file set appropriate to the wireless device through which the message is to be presented (e.g. transforming the message data via use of the retrieved XSL file set).

For additional examples of the process of FIG. 7 and device implementations thereof, please see herein incorporated by reference Provisional Patent Application No. 60/282,381. The remaining method steps of FIG. 7 function substantially as described elsewhere herein.

Figure 8:
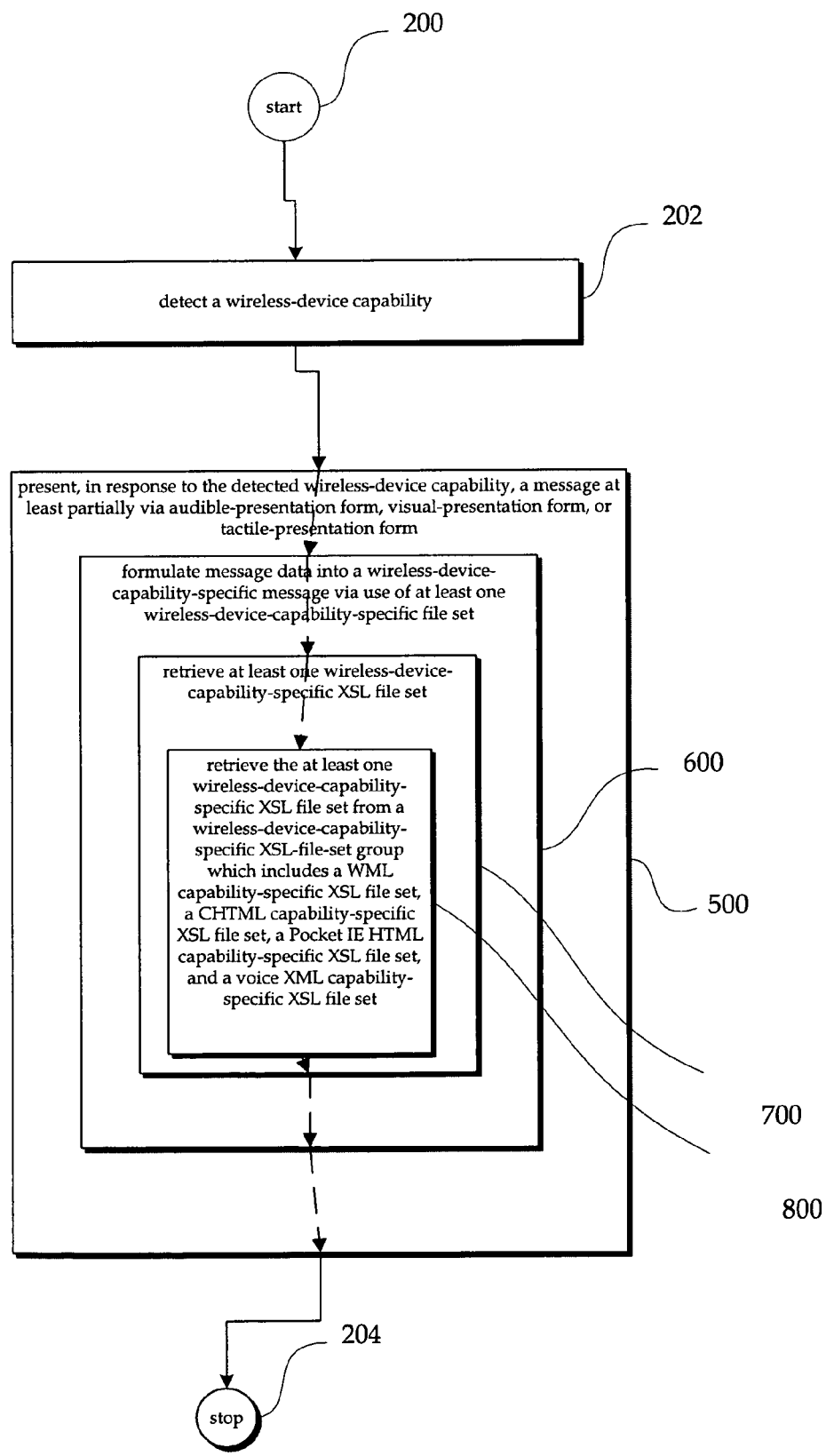
FIG. 8 depicts that, in one implementation, method step 700 can include method step 800.

With reference now to FIG. 8, shown is an implementation of the high-level logic flowchart shown in FIG. 7. Depicted in FIG. 8 is that, in one implementation, method step 700 can include method step 800. Illustrated is that, in one implementation, retrieving at least one wireless-device-capability-specific XSL file set can include, but is not limited to, retrieving at least one wireless-device-capability-specific XSL file set from a wireless-device-capability-specific XSL-file-set group which includes a WML capability-specific XSL file set, a CHTML capability-specific XSL file set, a Pocket IE HTML capability-specific XSL file set, and a voice XML capability-specific XSL file set. In one device implementation, method step 800 is achieved by a wireless web server entity (e.g., a part of MMP engine 104 of FIG. 1), subsequent to detecting the wireless-device capability, retrieving a wireless-device-capability-specific XSL file set from a wireless-device-type XSL-file-set library which in one implementation includes the foregoing specifically listed device-specific XSL file sets. However, those skilled in the art will recognize that the foregoing specifically listed device-specific XSL file sets are merely exemplary and that such listing is not exhaustive.

For additional examples of the process of FIG. 8 and device implementations thereof, please see herein incorporated by reference Provisional Patent Application No. 60/282,381. The remaining method steps of FIG. 8 function substantially as described elsewhere herein.

Figure 9:
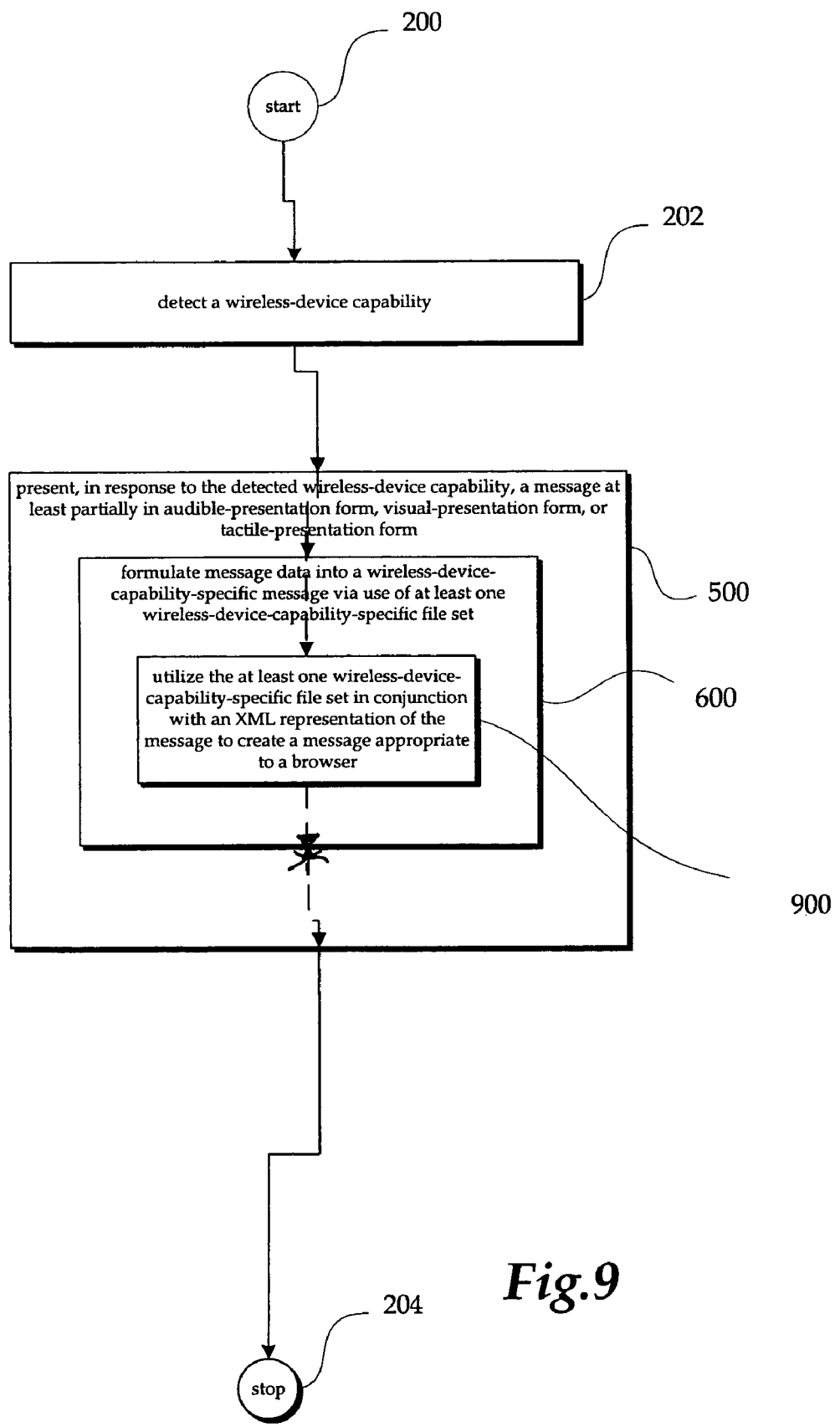
FIG. 9 shows that, in one implementation, method step 600 can include method step 900.

With reference now to FIG. 9, shown is an implementation of the high-level logic flowchart shown in FIG. 6. Depicted in FIG. 9 is that, in one implementation, method step 600 can include method step 900. Illustrated is that, in one implementation, formulating message data into a wireless-device-capability-specific message via use of at least one wireless-device-capability-specific file set can include, but is not limited to, utilizing the at least one wireless-device-capability-specific file set in conjunction with an XML representation of the message to create a message appropriate to a browser. In one device implementation, method step 900 is achieved by a wireless web server entity (e.g., a part of MMP engine 104 of FIG. 1) formulating a message created by a sender (e.g., sender 100) into an XML representation of the message.

For additional examples of the process of FIG. 9 and device implementations thereof, please see herein incorporated by reference Provisional Patent Application No. 60/282,381. The remaining method steps of FIG. 9 function substantially as described elsewhere herein.

Figure 10:
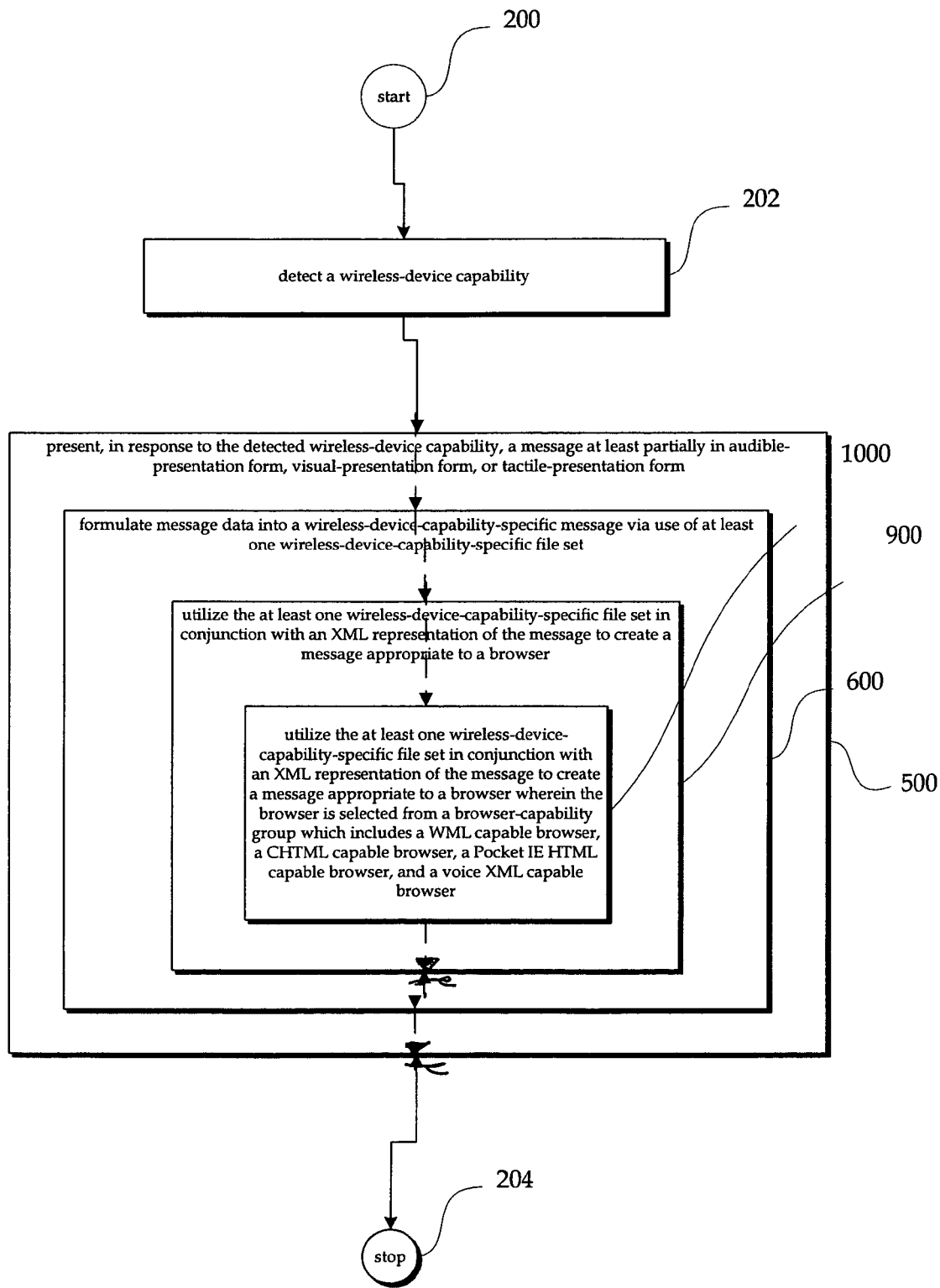
FIG. 10 depicts that, in one implementation, method step 900 can include method step 1000.

With reference now to FIG. 10, shown is an implementation of the high-level logic flowchart shown in FIG. 9. Depicted in FIG. 10 is that, in one implementation, method step 900 can include method step 1000. Illustrated is that, in one implementation, utilizing the at least one wireless-device-capability-specific file set in conjunction with an XML representation of the message to create a message appropriate to a browser can include, but is not limited to, utilizing the at least one device-specific file set in conjunction with an XML representation of the message to create a message appropriate to a browser wherein the browser is selected from a browser-capability group which includes a WML capable browser, a CHTML capable browser, a Pocket IE HTML capable browser, and a voice XML capable browser. In one device implementation, method step 1000 is achieved by a wireless web server entity (e.g., a part of MMP engine 104 of FIG. 1), subsequent to formulating a message created by a sender (e.g., sender 100) into an XML representation of the message, converting the XML representation of the message (message data) into a message appropriate to a particular type of browser, which in one implementation includes the foregoing specifically listed device-specific browser types. However, those skilled in the art will recognize that the foregoing specifically listed browser types are merely exemplary and that such listing is not exhaustive.

For additional examples of the process of FIG. 10 and device implementations thereof, please see herein incorporated by reference Provisional Patent Application No. 60/282, 381. The remaining method steps of FIG. 10 function substantially as described elsewhere herein.

Figure 11:
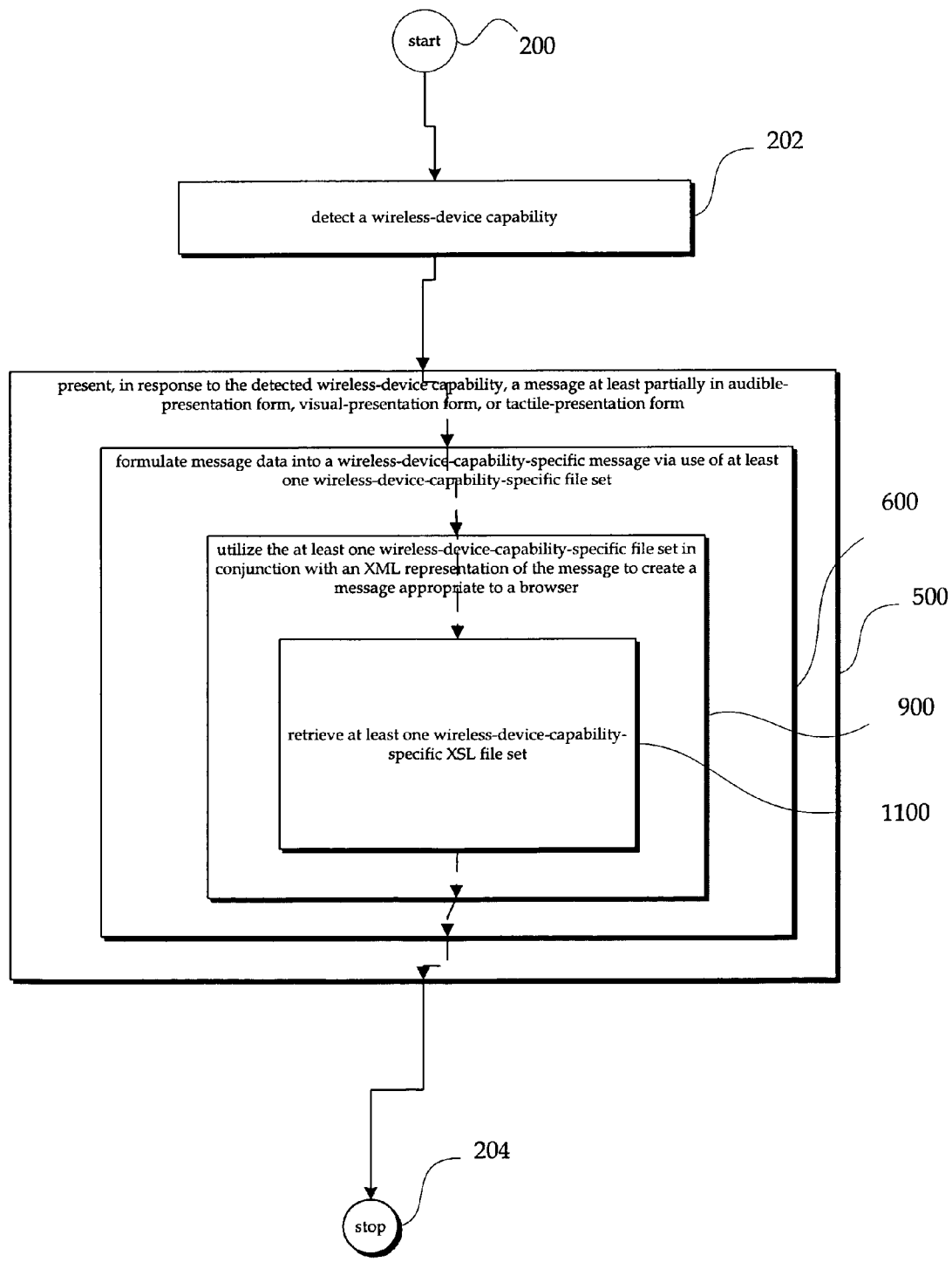
FIG. 11 shows that, in one implementation, method step 900 can include method step 1100.

With reference now to FIG. 11, shown is an implementation of the high-level logic flowchart shown in FIG. 9. Depicted in FIG. 11 is that, in one implementation, method step 900 can include method step 1100. Illustrated is that, in one implementation, utilizing the at least one wireless-device-capability-specific file set in conjunction with an XML representation of the message to create a message appropriate to a browser can include, but is not limited to, retrieving at least one wireless-device-capability-specific XSL file set. In one device implementation, method step 1100 is achieved by a wireless web server entity (e.g., a part of MMP engine 104 of FIG. 1) retrieving a wireless-device-capability-specific XSL file set appropriate to the wireless device through which the message is to be presented.

For additional examples of the process of FIG. 11 and device implementations thereof, please see herein incorporated by reference Provisional Patent Application No. 60/282,381. The remaining method steps of FIG. 11 function substantially as described elsewhere herein.

Figure 12:
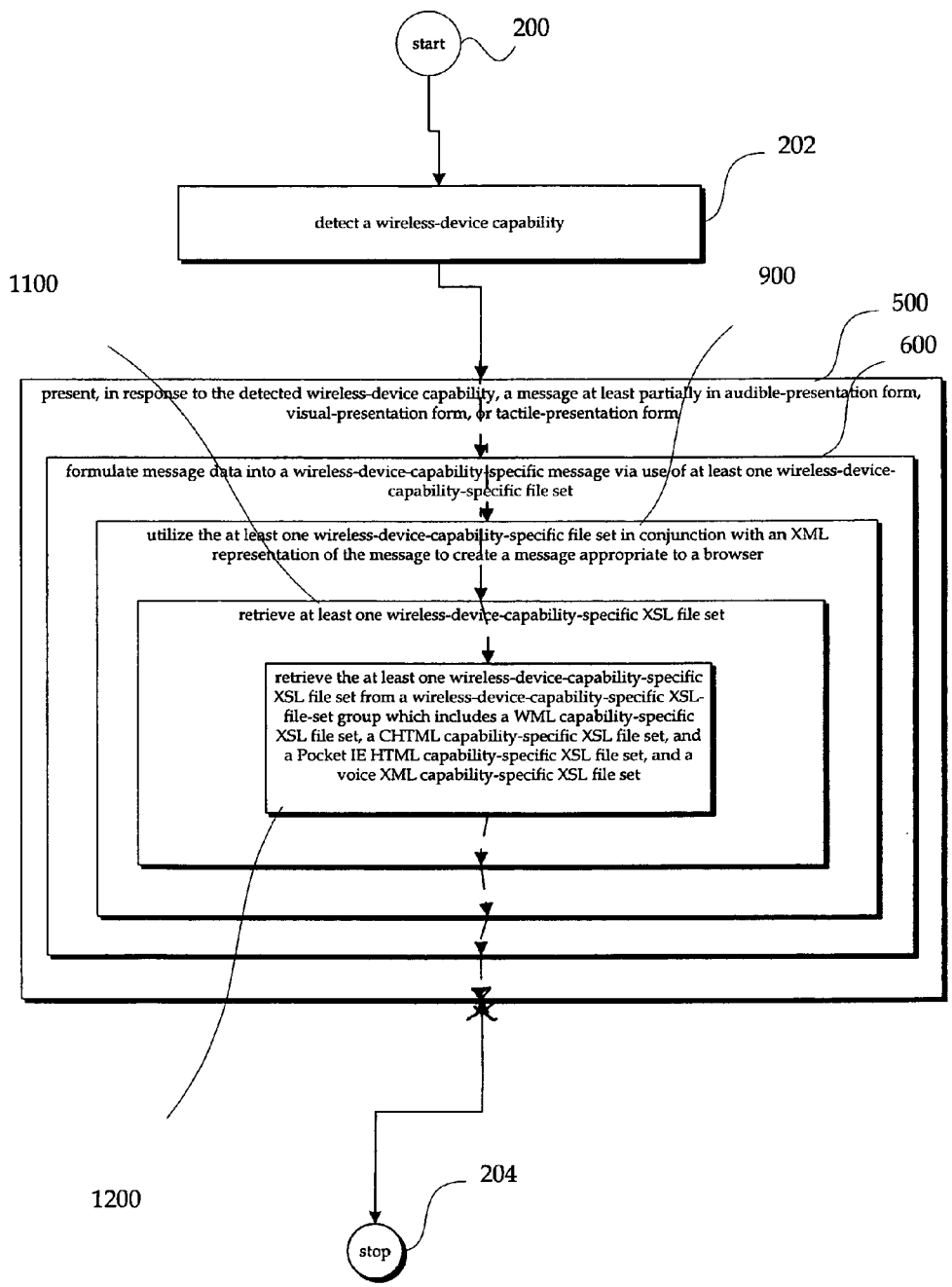
FIG. 12 depicts that, in one implementation, method step 1100 can include method step 1200.

With reference now to FIG. 12, shown is an implementation of the high-level logic flowchart shown in FIG. 11. Depicted in FIG. 12 is that, in one implementation, method step 1100 can include method step 1200. Illustrated is that, in one implementation, retrieving at least one wireless-device-capability-specific XSL file set can include, but is not limited to, retrieving the at least one wireless-device-capability-specific XSL file set from a wireless-device-capability-specific XSL-file-set group which includes a WML capability-specific XSL file set, a CHTML capability-specific XSL file set, a Pocket IE HTML capability-specific XSL file set, and a voice XML capability-specific XSL file set. (For example, such as was at least partially described in herein incorporated by reference Provisional Patent Application No. 60/282,381.) The remaining method steps of FIG. 12 function substantially as described elsewhere herein. In one device implementation, method step 1200 is achieved by a wireless web server entity retrieving a wireless-device-capability-specific XSL file set from a wireless-device-capability-specific XSL-file-set library which in one implementation includes the foregoing specifically listed wireless-device-capability-specific XSL file sets. However, those skilled in the art will recognize that the foregoing specifically listed device-specific XSL file sets are merely exemplary and that such listing is not exhaustive.

Those having ordinary skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having ordinary skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as one or more computer programs running on one or more computers (e.g., as one or more server programs running on one or more computer systems), as one or more programs running on one or more processors (e.g., as one or more thin client programs running on one or more processors), as firmware, or as virtually any combination thereof, and that designing the circuitry and/or writing the code for the software or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include, but are not limited to, the following: recordable type media such as floppy disks, hard disk drives, CD ROMs, digital tape, and transmission type media such as digital and analogue communication links using TDM or IP based communication links (e.g., packet links).

In a general sense, those skilled in the art will recognize that the various embodiments described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configurable by a computer program (e.g., a general purpose computer configurable by a computer program or a microprocessor configurable by a computer program), electrical circuitry forming a memory device (e.g., any and all forms of random access memory), and electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into data processing systems. That is, the devices and/or processes described herein can be integrated into a data processing system via a reasonable amount of experimentation. FIG. 13 shows an example representation of a data processing system into which at least a part of the herein described devices and/or processes may be integrated with a reasonable amount of experimentation.

With reference now to FIG. 13, depicted is a pictorial representation of a conventional data processing system in which illustrative embodiments of the devices and/or processes described herein may be implemented. It should be noted that a graphical user interface systems (e.g., Microsoft Windows 98 or Microsoft Windows NT operating systems) and methods can be utilized with the data processing system depicted in FIG. 13. Data processing system 1320 is depicted which includes system unit housing 1322, video display device 1324, keyboard 1326, mouse 1328, and microphone (not shown). Data processing system 1320 may be implemented utilizing any suitable computer such as a DELL portable computer system, a product of Dell Computer Corporation, located in Round Rock, Tex.; Dell is a trademark of Dell Computer Corporation.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be understood by those within the art that if a specific number of an introduced claim element is intended, such an intent will be explicitly recited in the claim, and in the absence of such recitation no such intent is present. For example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use of definite articles used to introduce claim elements. In addition, even if a specific number of an introduced claim element is explicitly recited, those skilled in the art will recognize that such recitation should typically be interpreted to mean at least the recited number (e.g., the bare recitation of "two elements," without other modifiers, typically means at least two elements, or two or more elements).

The embodiments of the invention in which an exclusive property or privilege is claimed are defined as follows:

1. A method comprising:
    creating a managed message to be sent to a list of recipient devices selected from a group of managed message types consisting of a memo, a meeting, and an event, each managed message type being further selected from a group of structured messaging element types consisting of an RSVP, a query, a thing to bring, a comment, a sender location, an electronic card, recipient list exposure, and an electronic commerce transaction;
    validating a format of an address of each recipient device from the list of recipient devices and determining a target wireless-device type by an asynchronous process that performs device processing, the asynchronous process marking the address as undeliverable if the format of the address associated with a recipient device is invalid; and
    receiving a response aggregation.

2. The method of claim 1, wherein said determining a target wireless-device type comprises:
    detecting a WML capable browser.

3. The method of claim 1, wherein said determining a target wireless-device type comprises:
    detecting a Compact HTML capable browser.

4. The method of claim 1, wherein said determining a target wireless-device type comprises:
    detecting a Pocket IE HTML capable browser.

5. The method of claim 1, wherein said determining a target wireless-device type comprises:
    detecting a Voice XML capable browser.

6. The method of claim 1, wherein said determining a target wireless-device type comprises:
    detecting a commercially available browser.

7. The method of claim 6, wherein said detecting a commercially-available browser comprises:
    associating a mark-up language with a detected Pocket IE browser.

8. The method of claim 6, wherein said detecting a commercially-available browser comprises:
    associating a mark-up language with a detected UP.browser.

9. The method of claim 6, wherein said detecting a commercially-available browser comprises:
    associating a mark-up language with a detected Palm Query Application browser.

10. The method of claim 1, wherein said determining a target wireless-device type comprises:
    determining a target wireless-device type via scanning of a Hyper Text Transfer Protocol (http) header.

11. The method of claim 1, further comprising:
    presenting, in response to the determined target wireless-device type, a message at least partially in audible-presentation form, visual-presentation form, or tactile-presentation form.

12. The method of claim 11, wherein said presenting, in response to the determined target wireless-device type, a message at least partially in audible-presentation form, visual-presentation form, or tactile-presentation form comprises:
    formulating message data into a wireless-device-capability-specific message via use of at least one wireless-device-capability-specific file set.

13. The method of claim 12, wherein said formulating message data into a wireless-device-capability-specific message via use of at least one wireless-device-capability-specific file set comprises:

retrieving at least one wireless-device-capability-specific XSL file set.

14. The method of claim 13, wherein said retrieving at least one wireless-device-capability-specific XSL file set comprises:
retrieving a WML capability-specific XSL file set.

15. The method of claim 13, wherein said retrieving at least one wireless-device-capability-specific XSL file set comprises:
retrieving a CHTML capability-specific XSL file set.

16. The method of claim 13, wherein said retrieving at least one wireless-device-capability-specific XSL file set comprises:
retrieving a Pocket IE HTML capability-specific XSL file set.

17. The method of claim 13, wherein said retrieving at least one wireless-device-capability-specific XSL file set comprises:
retrieving a voice XML capability-specific XSL file set.

18. The method of claim 12, wherein said formulating message data into a wireless-device-capability-specific message via use of at least one wireless-device-capability-specific file set comprises:
utilizing the at least one wireless-device-capability-specific file set in conjunction with an XML representation of the message to create a message appropriate to a browser.

19. The method of claim 18, wherein said utilizing the at least one wireless-device-capability-specific file set in conjunction with an XML representation of the message to create a message appropriate to a browser comprises:
utilizing the at least one wireless-device-capability-specific file set in conjunction with an XML representation of the message to create a message appropriate to a WML capable browser.

20. The method of claim 18, wherein said utilizing the at least one wireless-device-capability-specific file set in conjunction with an XML representation of the message to create a message appropriate to a browser comprises:
utilizing the at least one wireless-device-capability-specific file set in conjunction with an XML representation of the message to create a message appropriate to a CHTML capable browser.

21. The method of claim 18, wherein said utilizing the at least one wireless-device-capability-specific file set in conjunction with an XML representation of the message to create a message appropriate to a browser comprises:
utilizing the at least one wireless-device-capability-specific file set in conjunction with an XML representation of the message to create a message appropriate to a Pocket IE HTML capable browser.

22. The method of claim 18, wherein said utilizing the at least one wireless-device-capability-specific file set in conjunction with an XML representation of the message to create a message appropriate to a browser comprises:
utilizing the at least one wireless-device-capability-specific file set in conjunction with an XML representation of the message to create a message appropriate to a voice XML capable browser.

23. The method of claim 18, wherein said utilizing the at least one wireless-device-capability-specific file set in conjunction with an XML representation of the message to create a message appropriate to a browser comprises:
retrieving at least one wireless-device-capability-specific XSL file set.

24. The method of claim 23, wherein said retrieving at least one wireless-device-capability-specific XSL file set comprises:
retrieving a WML capability-specific XSL file set.

25. The method of claim 23, wherein said retrieving at least one wireless-device-capability-specific XSL file set comprises:
retrieving a CHTML capability-specific XSL file set.

26. The method of claim 23, wherein said retrieving at least one wireless-device-capability-specific XSL file set comprises:
retrieving a Pocket IE HTML capability-specific XSL file set.

27. The method of claim 23, wherein said retrieving at least one wireless-device-capability-specific XSL file set comprises:
retrieving a voice XML capability-specific XSL file set.

28. A system comprising:
means for creating a managed message to be sent to a list of recipient devices selected from a group of managed message types consisting of a memo, a meeting, and an event, each managed message type being further selected from a group of structured messaging element types consisting of an RSVP, a query, a thing to bring, a comment, a sender location, an electronic card, recipient list exposure, and an electronic commerce transaction;
means for validating a format of an address of each recipient device from the list of recipient devices and determining a target wireless-device type by an asynchronous process that performs device processing, the asynchronous process marking the address as undeliverable if the format of the address associated with a recipient device is invalid; and
means for receiving a response aggregation.

29. The system of claim 28, wherein said means for determining a target wireless-device type comprises:
means for detecting a WML capable browser.

30. The system of claim 28, wherein said determining a target wireless-device type comprises:
means for detecting a Compact HTML capable browser.

31. The system of claim 28, wherein said means for determining a target wireless-device type comprises:
means for detecting a Pocket IE HTML capable browser.

32. The system of claim 28, wherein said means for determining a target wireless-device type comprises:
means for detecting a Voice XML capable browser.

33. The system of claim 28, wherein said means for determining a target wireless-device type comprises:
means for detecting a commercially available browser.

34. The system of claim 33, wherein said means for detecting a commercially-available browser comprises:
means for associating a mark-up language with a detected Pocket IE browser.

35. The system of claim 33, wherein said means for detecting a commercially-available browser comprises:
means for associating a mark-up language with a detected UP.browser.

36. The system of claim 33, wherein said means for detecting a commercially-available browser comprises:
means for associating a mark-up language with a detected Palm Query Application browser.

37. The system of claim 28, wherein said means for determining a target wireless-device type comprises:
means for determining a target wireless-device type via scanning of a Hyper Text Transfer Protocol (http) header.

38. The system of claim 28, further comprising:
means for presenting, in response to the determined target wireless-device type, a message at least partially in audible-presentation form, visual-presentation form, or tactile-presentation form.

39. The system of claim 38, wherein said means for presenting, in response to the determined target wireless-device type, a message at least partially in audible-presentation form, visual-presentation form, or tactile-presentation form comprises:
means for formulating message data into a wireless-device-capability-specific message via use of at least one wireless-device-capability-specific file set.

40. The system of claim 39, wherein said means for formulating message data into a wireless-device-capability-specific message via use of at least one wireless-device-capability-specific file set comprises:
means for retrieving at least one wireless-device-capability-specific XSL file set.

41. The system of claim 40, wherein said means for retrieving at least one wireless-device-capability-specific XSL file set comprises:
means for retrieving a WML capability-specific XSL file set.

42. The system of claim 40, wherein said means for retrieving at least one wireless-device-capability-specific XSL file set comprises:
means for retrieving a CHTML capability-specific XSL file set.

43. The system of claim 40, wherein said means for retrieving at least one wireless-device-capability-specific XSL file set comprises:
means for retrieving a Pocket IE HTML capability-specific XSL file set.

44. The system of claim 40, wherein said means for retrieving at least one wireless-device-capability-specific XSL file set comprises:
means for retrieving a voice XML capability-specific XSL file set.

45. The system of claim 39, wherein said means for formulating message data into a wireless-device-capability-specific message via use of at least one wireless-device-capability-specific file set comprises:
means for utilizing the at least one wireless-device-capability-specific file set in conjunction with an XML representation of the message to create a message appropriate to a browser.

46. The system of claim 45, wherein said means for utilizing the at least one wireless-device-capability-specific file set in conjunction with an XML representation of the message to create a message appropriate to a browser comprises:
means for utilizing the at least one wireless-device-capability-specific file set in conjunction with an XML representation of the message to create a message appropriate to a WML capable browser.

47. The system of claim 45, wherein said means for utilizing the at least one wireless-device-capability-specific file set in conjunction with an XML representation of the message to create a message appropriate to a browser comprises:
means for utilizing the at least one wireless-device-capability-specific file set in conjunction with an XML representation of the message to create a message appropriate to a CHTML capable browser.

48. The system of claim 45, wherein said means for utilizing the at least one wireless-device-capability-specific file set in conjunction with an XML representation of the message to create a message appropriate to a browser comprises:
means for utilizing the at least one wireless-device-capability-specific file set in conjunction with an XML representation of the message to create a message appropriate to a Pocket IE HTML capable browser.

49. The system of claim 45, wherein said means for utilizing the at least one wireless-device-capability-specific file set in conjunction with an XML representation of the message to create a message appropriate to a browser comprises:
means for utilizing the at least one wireless-device-capability-specific file set in conjunction with an XML representation of the message to create a message appropriate to a voice XML capable browser.

50. The system of claim 45, wherein said means for utilizing the at least one wireless-device-capability-specific file set in conjunction with an XML representation of the message to create a message appropriate to a browser comprises:
means for retrieving at least one wireless-device-capability-specific XSL file set.

51. The system of claim 50, wherein said means for retrieving at least one wireless-device-capability-specific XSL file set comprises:
means for retrieving a WML capability-specific XSL file set.

52. The system of claim 50, wherein said means for retrieving at least one wireless-device-capability-specific XSL file set comprises:
means for retrieving a CHTML capability-specific XSL file set.

53. The system of claim 50, wherein said means for retrieving at least one wireless-device-capability-specific XSL file set comprises:
means for retrieving a Pocket IE HTML capability-specific XSL file set.

54. The system of claim 50, wherein said means for retrieving at least one wireless-device-capability-specific XSL file set comprises:
means for retrieving a voice XML capability-specific XSL file set.

55. The system of claim 28, wherein said means for determining a target wireless-device type comprises:
means for detecting a communication associated with the wireless device.

56. The system of claim 55, wherein said means for detecting a communication associated with the wireless device comprises:
means for transmitting a message associated with the wireless device.

57. The system of claim 56, wherein said means for transmitting a message associated with the wireless device comprises:
means for transmitting the message associated with a response aggregation.

58. A system comprising:
a first component configured to create a managed message to be sent to a list of recipient devices selected from a group of managed message types consisting of a memo, a meeting, and an event, each managed message type being further selected from a group of structured messaging element types consisting of an RSVP, a query, a thing to bring, a comment, a sender location, an electronic card, recipient list exposure, and an electronic commerce transaction;
a second component configured to validate a format of an address of each recipient device from the list of recipient devices and a third component configured to determine a target wireless-device type by an asynchronous process that performs device processing, the asynchronous process marking the address as undeliverable if the format of the address associated with a recipient device is invalid; and a fourth component configured to receive a response aggregation, said fourth component selected from an electrical-component group including electrical component having at least one discrete electrical component, electrical component having at least one integrated component, electrical component having at least one application specific integrated component, electrical component forming a general purpose computing device configured by a computer program, electrical component forming a memory device, and/or electrical component forming a communications device.

59. The system of claim 58, further comprising a fifth component configured to detect a communication associated with the wireless device comprises:

a sixth component configured to transmit a message associated with the wireless device.

60. The system of claim 59, wherein said sixth component configured to transmit a message associated with the wireless device comprises:

a seventh component configured to transmit the message associated with a response aggregation.

61. A computer-readable medium having computer-executable instructions stored thereon for implementing a computer-implementable method, comprising:

creating a managed message to be sent to a list of recipient devices selected from a group of managed message types consisting of a memo, a meeting, and an event, each managed message type being further selected from a group of structured messaging element types consisting of an RSVP, a query, a thing to bring, a comment, a sender location, an electronic card, recipient list exposure, and an electronic commerce transaction;

validating a format of an address of each recipient device from the list of recipient devices and determining a target wireless-device type by an asynchronous process that performs device processing, the asynchronous process marking the address as undeliverable if the format of the address associated with a recipient device is invalid; and receiving a response aggregation.

62. The method of claim 61, wherein said determining a target wireless-device type comprises:

detecting a commercially available browser.

63. The computer-readable medium of claim 61, wherein said determining a target wireless-device type comprises:

determining a target wireless-device type via scanning of a Hyper Text Transfer Protocol (http) header.

64. The method of claim 61, further comprising:

formulating message data into a wireless-device-capability-specific message via use of at least one wireless-device-capability-specific file set.

65. The method of claim 64, wherein said formulating message data into a wireless-device-capability-specific message via use of at least one wireless-device-capability-specific file set comprises:

utilizing the at least one wireless-device-capability-specific file set in conjunction with an XML representation of the message to create a message appropriate to a browser.

* * * * *